No. 678,629. Patented July 16, 1901.
C. H. SMITH.
LOCK NUT.
(Application filed Oct. 2, 1900.)
(No Model.)
Fig. 1.
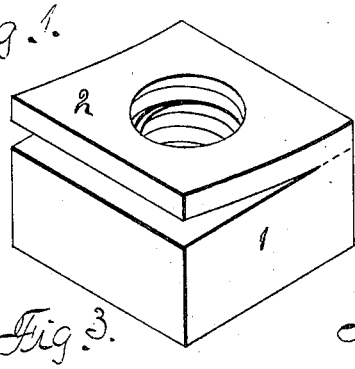
Fig. 2.  Fig. 3.  Fig. 4.
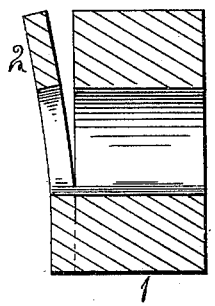 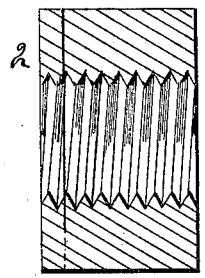 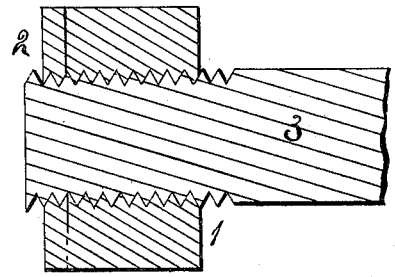
Fig. 5.
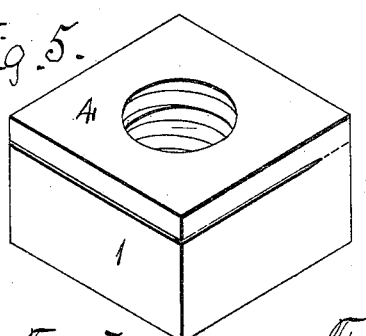
Fig. 6.  Fig. 7.  Fig. 8.
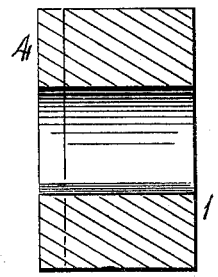 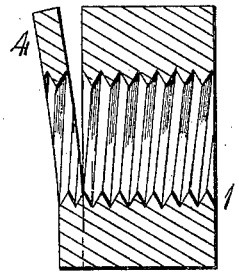 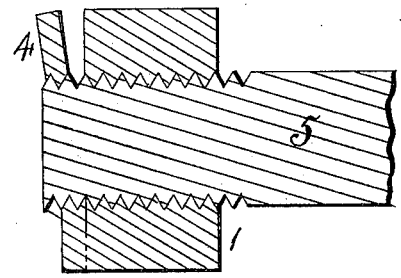
Witnesses:
J. P. Taylor
E. Behel.
Inventor:
Charles H. Smith
By A. O. Behel
Atty.

United States Patent Office.

CHARLES H. SMITH, OF OREGON, ILLINOIS, ASSIGNOR OF TWO-THIRDS TO JAMES C. FESLER, OF SAME PLACE, AND CHARLES RYSTROM, OF ROCKFORD, ILLINOIS.

LOCK-NUT.

SPECIFICATION forming part of Letters Patent No. 678,629, dated July 16, 1901.

Application filed October 2, 1900. Serial No. 31,799. (No model.)

*To all whom it may concern:*

Be it known that I, CHARLES H. SMITH, a citizen of the United States, residing at Oregon, in the county of Ogle and State of Illinois, have invented certain new and useful Improvements in Lock-Nuts, of which the following is a specification.

The object of this invention is to form a nut of ordinary construction with a lip of spring material, which will exert a pressure upon the threads of the bolt in the lengthwise direction of the bolt, thereby forming a lock-nut.

In the accompanying drawings, Figure 1 is an isometrical representation of my improved lock-nut. Fig. 2 is a section of the lock-nut before being threaded. Fig. 3 is a section showing the position of the spring-lip while the nut is being threaded. Fig. 4 shows the nut applied to a bolt. Figs. 5, 6, 7, and 8 are representations of a modified form of lock-nut, but retaining the feature of the spring-lip.

My improved lock-nut consists of a nut of ordinary construction, to which is secured a lip of spring material.

In constructing the nut shown at Figs. 1 to 4, inclusive, I employ an ordinary nut-blank 1, to which I weld a lip 2, of spring material, along one edge of the nut, as shown in dotted lines. The lip is held separated from the nut at its free edge, as shown at Fig. 2. In threading the nut and lip the lip is pressed by outside force, so that it will lie in contact with the face of the nut, and the nut and lip threaded in the usual manner, as shown at Fig. 3. In placing this lock-nut on the bolt 3 the lip is held against the face of the nut in the same position it occupied when the parts were being threaded, and when the nut is finally seated in place the pressure employed against the lip is removed, which will permit the lip to exert its spring-pressure against the threads of the bolt in the lengthwise direction of the bolt with sufficient force to hold the nut securely on the bolt. Upon applying the means for removing the pressure of the spring-lip the nut can be easily removed.

At Figs. 5 to 8, inclusive, is shown a modification of my improved lock-nut employing the spring-lip, in which the lip 4 is welded to the nut proper in a flat position, as shown at Fig. 5, and when the nut and lip are threaded the free edge of the lip is held away from the body of the nut, as shown at Fig. 7, and is held in this position when placed on the bolt 5, and when firmly seated the retaining means is removed, which will permit the spring-lip to exert its force upon the threads of the bolt in the lengthwise direction of the bolt with sufficient force to retain the nut in position, and upon removing the influence of the spring-lip the nut can be easily removed.

I claim as my invention—

1. A lock-nut comprising a nut proper having a separate lip of relatively thin spring material welded or otherwise secured along one edge only to one face of the nut and provided with a threaded opening coinciding with the opening in the nut, the free portion of said spring-lip acting normally to exert pressure in a direction lengthwise of the nut proper.

2. A lock-nut comprising a nut proper having a relatively thin lip secured along one edge thereof to one face of the nut and provided with a threaded opening coinciding with the opening in the nut, said spring-lip being formed of a separate plate of relatively thin spring metal welded to the nut proper, and having its free portion normally acting to exert pressure in a direction lengthwise of the opening in the nut.

CHARLES H. SMITH.

Witnesses:
CLARENCE S. HAAS,
CHARLES D. ETNYRE.